UNITED STATES PATENT OFFICE.

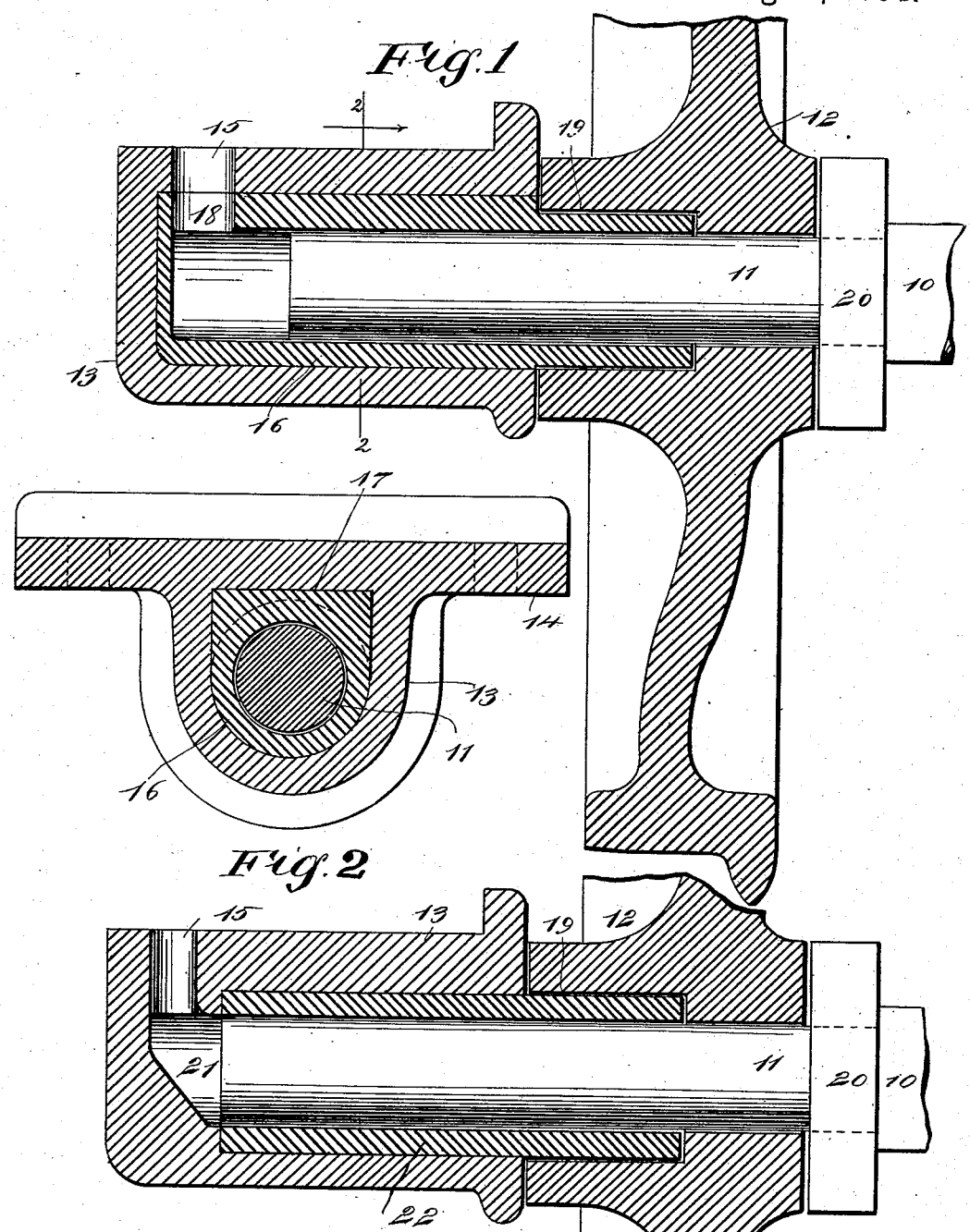

JOHN F. GALLAGHER, OF FOREST CITY, PENNSYLVANIA.

CAR-AXLE BOX.

SPECIFICATION forming part of Letters Patent No. 524,200, dated August 7, 1894.

Application filed May 10, 1894. Serial No. 510,746. (No model.)

*To all whom it may concern:*

Be it known that I, JOHN F. GALLAGHER, of Forest City, in the county of Susquehanna and State of Pennsylvania, have invented a new and Improved Car-Axle Box, of which the following is a full, clear, and exact description.

My invention relates to improvements in the boxes and bearings of car axles; and the object of my invention is to produce a simple, cheap and durable box and bearing, which may be conveniently applied to a car wheel and axle, and which when applied enables a quantity of oil to be inserted in the box and supplied to the bearing in a manner to keep the bearing well lubricated for a long time.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a longitudinal section of my improved box and bearing, as applied to a car wheel and axle. Fig. 2 is a cross section on the line 2—2 of Fig. 1; and Fig. 3 is a longitudinal section of a modified form of the invention.

The axle 10 is substantially of the usual kind and has a bearing spindle 11 which is adapted to project through the bore of the wheel 12 and into the box 13, which box is provided with the usual flanges 14 and is closed at the top, but is provided near its outer end and on the upper side with an oil hole 15 through which oil may be poured, and this hole may be stopped by any suitable device.

Within the box 13 is held a bearing 16, which is adapted to slip on over the spindle 11 and is preferably flat on top, as shown at 17, so that if the box 13 is similarly shaped in cross section the bearing is held in such a way that it cannot turn. It will be understood that the same effect may be obtained by producing corresponding flat walls on any abutting portions of the box and bearing. The bearing is closed at its outer end but has in its upper side a hole 18 to register with the hole 15 so that oil may be poured into the receptacle formed by the outer end of the bearing and the end of the spindle. The inner end of the bearing projects from the box 13 and is reduced so as to enter the enlarged portion 19 of the bore of the wheel 12. The axle and wheel are held in the correct relative positions by the collar 20 which is rigid on the axle and abuts with the wheel hub.

It will be seen that if the bearing is filled with oil the oil will find its way along the spindle 11 so as to lubricate the surface of the spindle next the bearing, and it will also run along the spindle into the wheel hub, thus lubricating the whole length of the spindle. Instead of making the bearing with a flattened side, as illustrated, and with an opening on top, a plain cylindrical tube 22 may be used, as shown in Fig. 3, which enters the bore of the wheel like the bearing already described, but which is open at both ends and is fixed rigidly in the box 13, either by shrinking the box on the tube or in any other convenient way. When this form of bearing is used, the outer end of the box and the end of the spindle form the oil receptacle and the end of the box is inclined on the inner side, as shown at 21 in Fig. 3, and the oil poured into the said receptacle finds its way into the tube and around the spindle of the axle, as already described.

Having thus described my invention, I claim as new and desire to secure by Letters Patent—

1. The combination of a wheel having a portion of its bore enlarged, an axle projecting through the wheel, a box provided with an oil opening, and a bearing secured in the box and having its inner end projecting into the enlarged portion of the bore of the wheel, substantially as described.

2. The combination, of the axle, the car wheel having a portion of its bore enlarged, the box having an oil hole therein, and the bearing held rigidly in the box and having its inner end reduced and fitting in the enlarged portion of the bore of the wheel, substantially as described.

3. The combination, of the axle, the car wheel having an enlarged bore, the box closed except for an oil hole in the top, and the hollow bearing having one end arranged to penetrate the bore of the wheel, the bearing and box having flattened meeting sides, substantially as described.

JOHN F. GALLAGHER.

Witnesses:
 JAMES WHITE,
 DANIEL MELVIN.